United States Patent
Vasquez

(10) Patent No.: US 7,586,499 B1
(45) Date of Patent: Sep. 8, 2009

(54) METHOD AND APPARATUS FOR ADJUSTING THE COLOR OF A DIGITAL IMAGE

(75) Inventor: David C. Vasquez, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 464 days.

(21) Appl. No.: 11/430,736

(22) Filed: May 8, 2006

(51) Int. Cl.
*G09G 5/02* (2006.01)

(52) U.S. Cl. .................. 345/594; 715/810; 715/833; 715/834

(58) Field of Classification Search .................. 345/594; 715/810, 833, 834
See application file for complete search history.

(56) References Cited

U.S. PATENT DOCUMENTS

2006/0066628 A1 * 3/2006 Brodie et al. ............... 345/594

OTHER PUBLICATIONS

Rebholz, Gary and Michael Bryant, Vegas 4.0: learn to use the new features, 2003, Sonic Foundry, Inc., p. iv, 5-8, 33.*
O'Quinn, Donnie, Photoshop (R) 6 Shop Manual, 2002, New Riders Publishing.*

* cited by examiner

*Primary Examiner*—Xiao M Wu
*Assistant Examiner*—Lillian K Ng
(74) *Attorney, Agent, or Firm*—Robert C Kowert; Meyertons, Hood, Kivlin, Kowert & Goetzel, P.C.

(57) ABSTRACT

One embodiment of the present invention provides a system for making a color adjustment to a digital image. The system displays a digital image in a user interface. Upon receiving an adjustment to a gain control, the system adjusts a magnitude of a color adjustment made to a digital image when a user moves an adjustment indicator within a two-dimensional region that displays a spectrum of possible adjustments for the color of the digital image. Upon receiving a color adjustment from the adjustment indicator, the system adjusts the color of the digital image based on the color adjustment.

18 Claims, 3 Drawing Sheets

METHOD AND APPARATUS FOR ADJUSTING THE COLOR OF A DIGITAL IMAGE

BACKGROUND

1. Field of the Invention

The present invention relates to techniques for editing digital images. More specifically, the present invention relates to a method and apparatus for adjusting the color of a digital image.

2. Related Art

As digital photography and digital moviemaking have become more popular, an increasing number of users are routinely using image-editing programs to manipulate digital images and movies. Recently developed image-editing programs contain many powerful features which enable users to make many sophisticated and subtle adjustments to their digital images and movies.

Unfortunately, these features are often arcane and challenging to use. For example, typical image-editing programs contain many features that enable a user to adjust the color of a digital image. However, these color-adjustment features are difficult to utilize. For example, one common color-adjustment interface includes a region within the interface that represents a spectrum of possible color-adjustments. In order to adjust the color of a digital image, the user uses a mouse to drag an indicator to a chosen area within the region. For example, if the user prefers an image that is more blue, the user simply drags the indicator to a more "blue" area of the region. When the user releases the indicator, the image-editing program adjusts the color of the digital image accordingly.

A problem occurs when a user wants to make a particularly fine or a coarse adjustment and the color-adjustment interface is set up for the opposite type of adjustment. For example, if the color-adjustment region is set up to make fine adjustments but the user desires to make a coarse adjustment, the user may have to drag the indicator through dozens of inches of movement with the mouse to achieve a desired color-adjustment. In other words, the user may have to repeatedly move the mouse to the extent of its travel, pick up the mouse, move the mouse back to the start position, and move the mouse to the extent of its travel again. Moving the mouse through such a distance to make a color-adjustment makes the image-editing software difficult to use. Conversely, if the color-adjustment region is set up for coarse adjustments but the user desires to make fine adjustments, the fine adjustment may not be possible, even if the user is very careful in moving the mouse.

Hence, what is needed is an image-editing program without the above-described problems.

SUMMARY

One embodiment of the present invention provides a system for making a color adjustment to a digital image. The system starts by displaying a digital image in a user interface. Upon receiving an adjustment to a gain control, the system adjusts a magnitude of a color adjustment made to a digital image when a user moves an adjustment indicator within a two-dimensional region that displays a spectrum of possible adjustments for the color of the digital image. Upon receiving a color adjustment from the adjustment indicator, the system adjusts the color of the digital image based on the color adjustment.

In a variation of this embodiment, receiving an adjustment to the gain control involves receiving a signal that indicates the position of a gain control along an angle line, wherein the angle line extends from the center of the two-dimensional region to the adjustment indicator.

In a variation on this embodiment, adjusting the magnitude of the color change involves reducing the magnitude of the color change when the gain control is moved closer to the center of the two-dimensional region.

In a variation of this embodiment, adjusting the magnitude of the color change involves increasing the magnitude of the color change when the gain control is moved closer to the adjustment indicator.

In a variation of this embodiment, the system refreshes the display of the spectrum of possible adjustments upon receiving an adjustment to the gain control.

In a variation of this embodiment, making an angular adjustment to the adjustment indicator adjusts hue, making a radial adjustment to the adjustment indicator adjusts saturation, and adjusting the gain control adjusts the magnitude of the saturation adjustment for a radial adjustment of the adjustment indicator.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Color Control

Figure 1A:
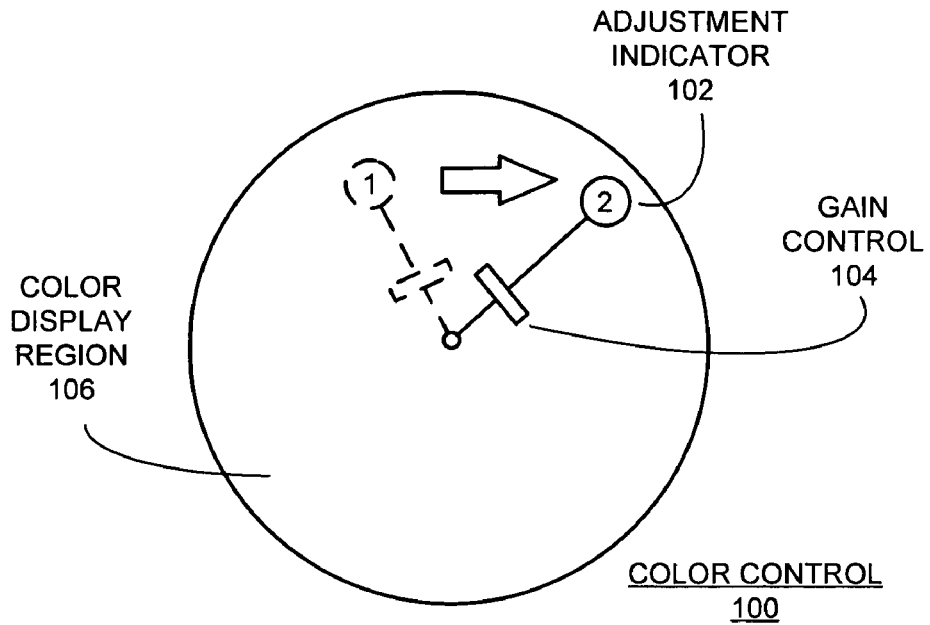
FIG. 1A illustrates a color control in accordance with an embodiment of the present invention.
Figure 1B:
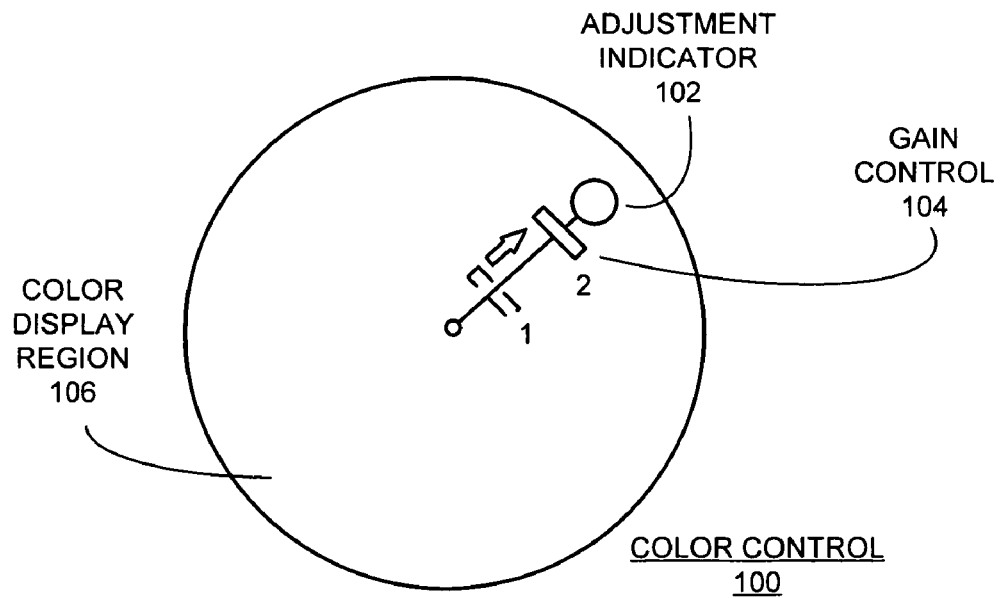
FIG. 1B illustrates a color control in accordance with an embodiment of the present invention.

FIG. 1A and FIG. 1B illustrate color control 100 in accordance with an embodiment of the present invention. Color control 100 is displayed in a user interface ("UI") 200 (see FIG. 2) for an image-editing program. The user of the image-editing program uses color control 100 to select colors values to adjust corresponding colors in a digital image.

The image-editing program displays a spectrum of colors in color display region 106. For example, in one embodiment of the present invention, the spectrum includes cyan at the 0 degree position of color display region 106, fading from cyan to yellow at 120 degrees, fading from yellow to magenta at 240 degrees, and then fading from magenta back to cyan at 0 degrees. As each color fades into the next, each selectable combination of the two adjacent colors is represented. Closer to the center of color display region, combinations involving all three colors are represented. In this way, each selectable combination of the primary colors is displayed within the region. Note that although this example uses three primary colors, the image-editing program could display any of a number of primary colors. In an alternative embodiment, color display region 106 displays a spectrum where the primary colors are "flesh tones." In another alternative embodiment, color display region 106 displays a spectrum where the primary colors represent "lightness."

Color control 100 includes an adjustment indicator 102 and a gain control 104. The user selects a color within color display region 106 using adjustment indicator 102. To select a color, the user clicks on adjustment indicator 102 and drags adjustment indicator 102 within color display region 106 (see FIG. 1A). The user releases adjustment indicator 102 when adjustment indicator 102 is located over the desired color value within color display region 106. When the user releases adjustment indicator 102, the image-editing program adjusts the color of the digital image according to the selected color. In an alternative embodiment, the image-editing program continuously adjusts the color of the digital image as the user drags adjustment indicator 102 within color display region 106. When the user releases adjustment indicator 102, the digital image remains a given color which is consistent with the position of adjustment indicator 102.

The user uses gain control 104 to adjust the magnitude of color changes made when the user moves adjustment indicator 102. The user can position gain control 104 along the line between the center of color control 100 and adjustment indicator 102. If the user positions gain control 104 closer to the center of color control 100, the magnitude of changes made by moving adjustment indicator 102 is smaller. On the other hand, if the user positions gain control 104 further from the center of color control 100 (closer to adjustment indicator 102), the magnitude of change made by moving adjustment indicator 102 is larger.

The image-editing program updates the spectrum of colors displayed within color display region 106 while the user is repositioning gain control 104. Updating the spectrum of colors provides the user with a visual indication of the color changes that are possible for a given position of gain control 104.

In one embodiment of the present invention, an angular movement of adjustment indicator 102 adjusts the hue of the digital image, while a radial movement of adjustment indicator 102 adjusts saturation, and gain control 104 adjusts the magnitude of the saturation changes. In an alternative embodiment, an angular movement of adjustment indicator 102 adjusts the lightness of the digital image, while a radial movement of adjustment indicator 102 adjusts saturation, and gain control 104 adjusts the magnitude of the saturation changes.

User Interface

Figure 2:
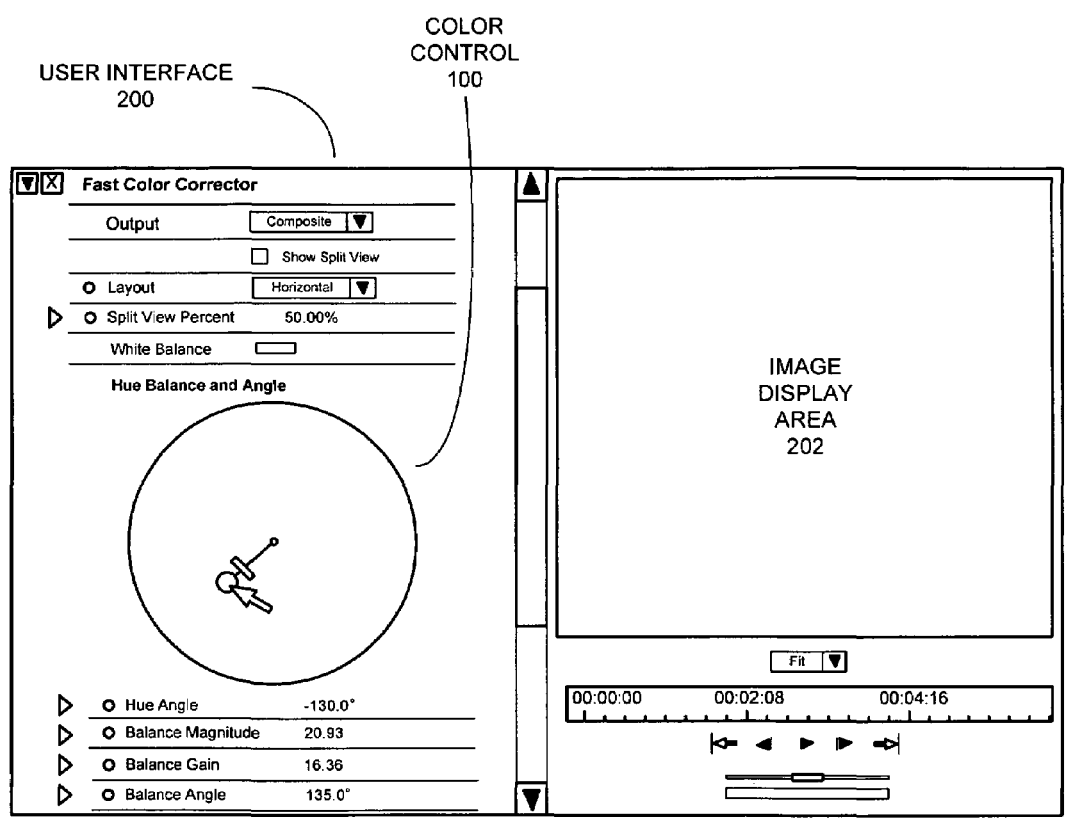
FIG. 2. illustrates a user interface (UI) in accordance with an embodiment of the present invention.

FIG. 2 illustrates a UI 200 for an image editing program in accordance with an embodiment of the present invention.

UI 200 includes multiple controls for editing digital images, including controls that manage the display type, controls for selecting images, and controls for displaying the selected images. UI 200 also includes image display area 202, where the image-editing program displays the selected image while the user edits the selected image. In addition, UI 200 includes color control 100 (see FIGS. 1A-1B).

If the user decides to adjust the color of the displayed image, the user can click on adjustment indicator 102 and drag adjustment indicator 102 within color display region 106 until adjustment indicator 102 is located over a desired color value. When the user releases adjustment indicator 102 over the desired color value, the image-editing program updates the colors of the displayed image accordingly.

If the user finds that they cannot make the adjustment quickly enough (i.e., making the proper adjustment requires excessive mouse movement), the user can slide gain control 104 toward the edge of color control 100 (towards adjustment indicator 102). Positioning gain control 104 closer to the edge of color control 100 increases the magnitude of saturation changes, thereby giving the movement of adjustment indicator 102 a larger effect on the color of the image. This allows the user to drag adjustment indicator 102 a short distance and make a large change in color.

On the other hand, if the user finds that they are making adjustments too quickly (i.e., making the proper adjustment requires infinitesimal mouse movement), the user can slide gain control 104 toward the center of color control 100. Positioning gain control 104 further from the edge of color control 100 decreases the magnitude of saturation changes, thereby giving the movement of the adjustment indicator a smaller effect on the color of the image. This allows the user to drag adjustment indicator 102 a large distance and make a small change in color.

Color Adjustment

Figure 3:
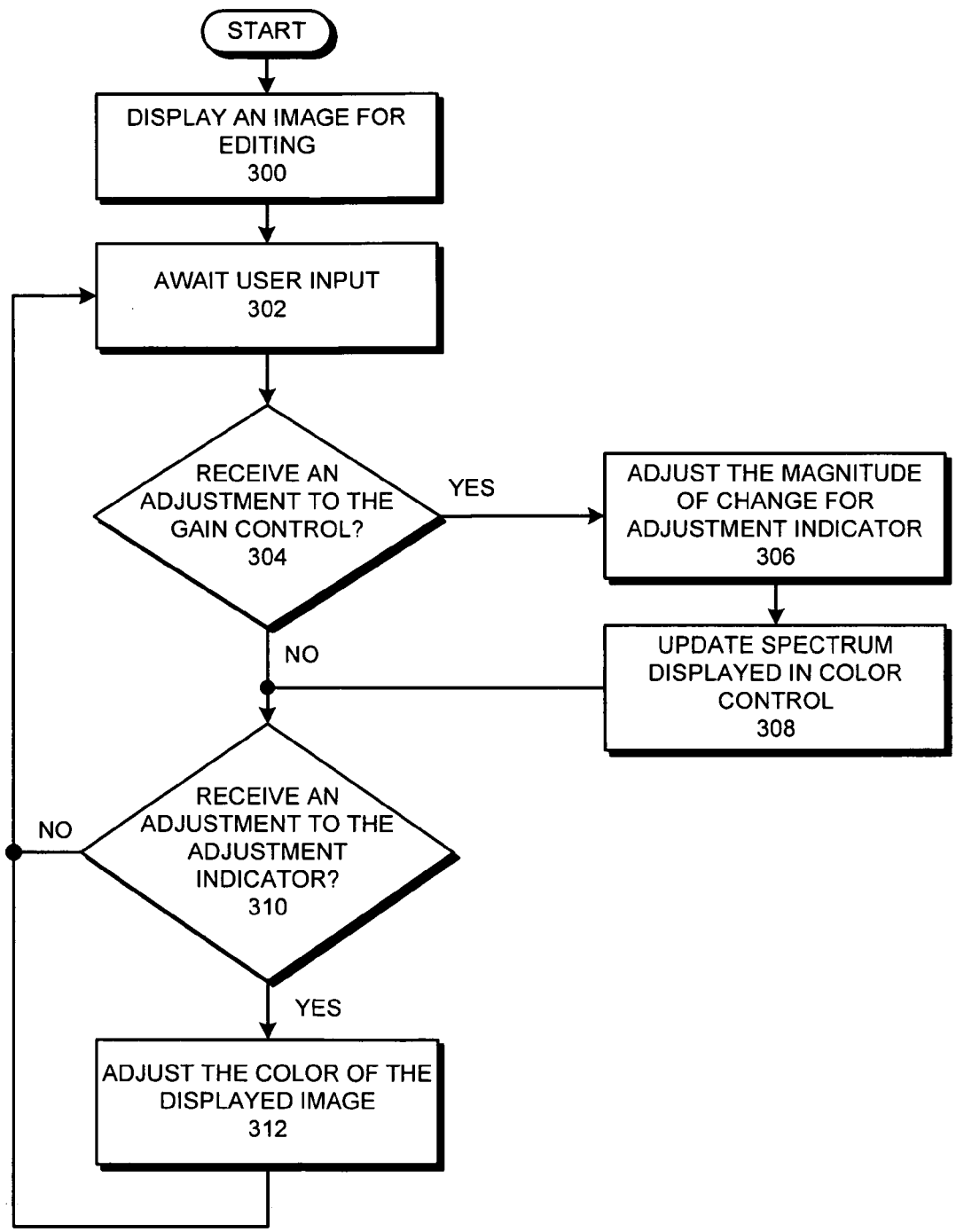
FIG. 3 presents a flow chart illustrating a color adjustment process in accordance with an embodiment of the present invention.

FIG. 3 presents a flow chart illustrating a color adjustment in accordance with an embodiment of the present invention.

The system starts with an image-editing program displaying a digital image for editing (step 300) and awaiting user input (step 302). Note that the image-editing program displays the digital image editing in a UI (such as UI 200 in FIG. 2) that includes a color control 100 (see FIG. 1).

Upon receiving input from the user, the program determines if the user has adjusted gain control 104 (step 304). If so, the program updates the magnitude of color changes made when the user subsequently moves adjustment indicator 102 within color display region 106 (step 306). The program also updates the color spectrum displayed in color display region 106 (step 308).

If the input was not an adjustment to the gain control, the image-editing program determines if the user has repositioned adjustment indicator 102 (step 310). If so, the image-editing program adjusts the color of the displayed image according to the color selected by the user (step 312). The image-editing program then returns to step 302 to await user input.

If the user input was neither an adjustment of gain control 104 nor a repositioning of adjustment indicator 102, the image-editing program returns to step 302 to await user input.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A graphical interface, comprising:
    an image display, which displays a digital image, wherein a color of at least a portion of said digital image is to be adjusted;

a color control comprising a two-dimensional region that displays a spectrum of different selectable colors for the color of said at least a portion of said digital image;

an adjustment indicator configured to be moved freely within the region of the color control, wherein the graphical interface is configured to adjust the color of said at least a portion of said digital image to a particular color in response to the movement of the adjustment indicator to a position coinciding with the position of said particular color within the region of the color control; and a gain control associated with the color control, wherein the graphical interface is configured to, in response to a movement of said gain control relative to the adjustment indicator, adjust a magnitude of color adjustment associated with moving the adjustment indicator a given distance within said region, wherein to adjust the magnitude of said color adjustment the graphical interface is configured to change said spectrum of different selectable colors within said region to a different spectrum of selectable colors, wherein said gain control is wholly comprised within said region and superimposed over at least some of said selectable colors of the region.

2. The graphical interface of claim 1, further comprising an angle line, wherein the angle line extends from the center of the color control to the adjustment indicator.

3. The graphical interface of claim 2, wherein the gain control is positioned on the angle line.

4. The graphical interface of claim 3, wherein the graphical interface is configured to, in response to the gain control moving closer to the center of the color control along the angle line, decreasing the magnitude of the color adjustment associated with moving the adjustment indicator a given distance within said region.

5. The graphical interface of claim 3, wherein the graphical interface is configured to, in response to the gain control moving further from the center of the color control along the angle line, increasing the magnitude of the color adjustment associated with moving the adjustment indicator a given distance within said region.

6. The graphical interface of claim 1, wherein the graphical interface is configured such that making an angular adjustment to the adjustment indicator adjusts a hue, making a radial adjustment to the adjustment indicator adjusts a saturation, and adjusting the gain control adjusts a magnitude of the saturation adjustment for a radial adjustment of the adjustment indicator.

7. A method, comprising:
displaying a digital image in a user interface of a computer system;
providing a color control comprising a region of said user interface that displays a spectrum of different selectable colors;
in response to receiving an adjustment to a gain control relative to an adjustment indicator, said gain control wholly comprised within said region and superimposed over at least some of said selectable colors of the region, changing a magnitude of color adjustment associated with moving the adjustment indicator a given distance, wherein changing said magnitude of color adjustment comprises changing said spectrum of different selectable colors within said region to a different spectrum of selectable colors;
subsequent to changing said magnitude, determining a particular color adjustment in response to the movement of the adjustment indicator from a first color to a second color within said region, wherein said particular color adjustment is based on the changed magnitude; and
adjusting the color of the digital image based on the particular color adjustment.

8. The method of claim 7, wherein receiving an adjustment to the gain control comprises receiving an indication that a user has moved the gain control a given distance along an angle line, wherein the angle line extends from the center of the two-dimensional region to the adjustment indicator.

9. The method of claim 8, wherein changing the magnitude of the color adjustment comprises reducing the magnitude of the color adjustment when the gain control is moved closer to the center of the two-dimensional region along the angle line.

10. The method of claim 8, wherein changing the magnitude of the color adjustment comprises increasing the magnitude of the color adjustment when the gain control is moved closer to the adjustment indicator along the angle line.

11. The method of claim 7, wherein the method comprises making an angular adjustment to the adjustment indicator in order to adjust a hue, making a radial adjustment to the adjustment indicator in order to adjust a saturation, and adjusting the gain control in order to adjust a magnitude of the saturation adjustment for a radial adjustment of the adjustment indicator.

12. A computer-readable storage medium storing instructions that when executed by a computer cause the computer to perform a method comprising:
displaying a digital image in a user interface;
providing a color control comprising a region of said user interface that displays a spectrum of different selectable colors;
in response to receiving an adjustment to a gain control relative to an adjustment indicator, said gain control wholly comprised within said region and superimposed over at least some of said selectable colors of the region, changing a magnitude of color adjustment associated with moving the adjustment indicator a given distance, wherein changing said magnitude of color adjustment comprises changing said spectrum of different selectable colors within said region to a different spectrum of selectable colors;
subsequent to changing said magnitude, determining a particular color adjustment in response to the movement of the adjustment indicator from a first color to a second color within said region, wherein said particular color adjustment is based on the changed magnitude; and
adjusting the color of the digital image based on the particular color adjustment.

13. The computer readable storage medium of claim 12, wherein receiving an adjustment to the gain control comprises receiving an indication that a user has moved the gain control a given distance along an angle line, wherein the angle line extends from the center of the two-dimensional region to the adjustment indicator.

14. The computer readable storage medium of claim 13, wherein changing the magnitude of the color adjustment comprises reducing the magnitude of the color adjustment when the gain control is moved closer to the center of the two-dimensional region along the angle line.

15. The computer readable storage medium of claim 13, wherein changing the magnitude of the color adjustment comprises increasing the magnitude of the color adjustment when the gain control is moved closer to the adjustment indicator along the angle line.

16. The computer readable storage medium of claim 12, wherein said method comprises making an angular adjustment to the adjustment indicator in order to adjust a hue, making a radial adjustment to the adjustment indicator in order to adjust a saturation, and adjusting the gain control in order to adjust a magnitude of the saturation adjustment for a radial adjustment of the adjustment indicator.

17. A system, comprising a first computer system including a processor and a memory comprising code executable by the processor to implement:

a user interface within the first computer system, which displays a digital image; wherein a color of at least a portion of said digital image is to be adjusted;

a color control within the user interface comprised of a two-dimensional region that displays a spectrum of different selectable colors for the color of said at least a portion of said digital image;

an adjustment indicator configured to be moved freely within the region of the color control, wherein the graphical interface is configured to adjust the color of said at least a portion of said digital image to a particular color in response to the movement of the adjustment indicator to a position coinciding with the position of said particular color within the region of the color control; and a gain control associated with the color control, wherein the graphical interface is configured to, in response to a movement of said gain control relative to the adjustment indicator, adjust a magnitude of color adjustment associated with moving the adjustment indicator a given distance within said region, wherein to adjust the magnitude of said color adjustment the graphical interface is configured to change said spectrum of different selectable colors within said region to a different spectrum of selectable colors, wherein said gain control is wholly comprised within said region and superimposed over at least some of said selectable colors of the region.

18. The system of claim 17, wherein the system further includes a server computer system;

wherein the first computer system is a client computer system, which communicates with the server computer system;

wherein the server computer system is configured to interact with the user interface on the client computer system and to adjust the color of the digital image in accordance with the position of the adjustment indicator and the gain control in the user interface.

* * * * *

UNITED STATES PATENT AND TRADEMARK OFFICE
CERTIFICATE OF CORRECTION

| | | |
|---|---|---|
| PATENT NO. | : 7,586,499 B1 | Page 1 of 1 |
| APPLICATION NO. | : 11/430736 | |
| DATED | : September 8, 2009 | |
| INVENTOR(S) | : David C. Vasquez | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Fourteenth Day of September, 2010

David J. Kappos
*Director of the United States Patent and Trademark Office*